US012771391B2

(12) United States Patent
Meholensky et al.

(10) Patent No.: US 12,771,391 B2
(45) Date of Patent: Oct. 20, 2026

(54) METHOD FOR USE AND COMPENSATION OF A LINEAR ADAPTIVE RF FILTER

(71) Applicant: Rockwell Collins, Inc., Cedar Rapids, IA (US)

(72) Inventors: Michael C. Meholensky, Marion, IA (US); Jonathan A. Lovseth, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 336 days.

(21) Appl. No.: 18/429,722

(22) Filed: Feb. 1, 2024

(65) Prior Publication Data

US 2025/0253879 A1 Aug. 7, 2025

(51) Int. Cl.

*H04B 1/12* (2006.01)
*H04B 1/00* (2006.01)
*H04B 1/10* (2006.01)

(52) U.S. Cl.

CPC ........... *H04B 1/123* (2013.01); *H04B 1/0003* (2013.01); *H04B 1/1027* (2013.01)

(58) Field of Classification Search

CPC ..... H04B 1/123; H04B 1/0003; H04B 1/1027
See application file for complete search history.

(56) References Cited

U.S. PATENT DOCUMENTS 5,841,810 A 11/1998 Wong et al.
5,867,065 A * 2/1999 Leyendecker ........ H03F 1/3247 330/149
6,028,895 A 2/2000 Dinsel et al.
7,085,314 B2 8/2006 Zhu et al.
7,212,582 B2 5/2007 Zhang
7,263,144 B2 8/2007 Sasson et al.
8,085,890 B2 12/2011 Urvas
8,259,839 B2 9/2012 Rudolph
9,825,657 B2 11/2017 Tabatabai et al.
2004/0151257 A1* 8/2004 Staszewski ........... H03F 1/3282 375/296
2005/0195919 A1* 9/2005 Cova ..................... H03F 1/3294 375/297
2009/0195426 A1* 8/2009 Ballantyne ............. H03M 3/50 341/144

FOREIGN PATENT DOCUMENTS

EP 0549019 B1 10/1998
EP 1511254 A3 3/2005
EP 4236363 A3 8/2023
WO 2014097470 A1 6/2014

* cited by examiner

*Primary Examiner* — Kabir A Timory
(74) *Attorney, Agent, or Firm* — Suiter Swantz IP

(57) ABSTRACT

A method for generating a corrected radio frequency RF signal is disclosed. The method includes measuring a transfer function associated with one state of a predicted plurality of states of a signal conditioning circuit of the RF receiver, reporting the transfer function, calculating an inverse transfer function based on the transfer function; and storing the inverse transfer function in the memory of the receiver. The method may further include receiving an analog input RF signal. The method may further include digitizing the analog input RF signal, wherein digitizing the analog input RF signal generates a digital input RF signal. The method may further include convolving the digital input RF signal with the inverse transfer function to generate a digital output RF signal.

7 Claims, 13 Drawing Sheets

METHOD FOR USE AND COMPENSATION OF A LINEAR ADAPTIVE RF FILTER

GOVERNMENT SUPPORT

This invention was developed with U.S. government support under contract FA8650-21-C-7005 awarded by the United States Air Force. The government of the United States of America has certain rights in this invention.

BACKGROUND

Narrowband interference can distort wideband signals within a wideband communication system. In these systems, amplifiers, analog-to-digital converters, and other system componentry can be driven non-linear causing excess energy products to be formed that distort and hide the received signal in space. To compensate for these non-linear effects, interferers are often filtered to reduce their effect on the desired signal and to maintain linearity in the system. However, wideband received signals, interferers, and filters often overlap in frequency in real systems distorting the wideband signals over their bandwidth. Therefore, there is a need for systems and methods that competently filter communication signals in the presence of these non-linear effects.

SUMMARY

In some embodiments, the techniques described herein relate to a method for generating a corrected output radio frequency (RF) signal: generating an inverse transfer function stored in a memory of an RF receiver including: measuring a transfer function associated with one state of a predicted plurality of states of a signal conditioning circuit of the RF receiver; reporting the transfer function; calculating an inverse transfer function based on the transfer function; and storing the inverse transfer function in the memory of the receiver; receiving an analog input RF signal; digitizing the analog input RF signal, wherein digitizing the analog input RF signal generates a digital input RF signal; and convolving the digital input RF signal with the inverse transfer function to generate a digital output RF signal.

In some embodiments, the techniques described herein relate to a method, wherein storing the inverse transfer function in the memory of the receiver further includes storing the inverse transfer function in a lookup table, wherein the method further includes: before convolving the digital input RF signal, determining a current state of the signal conditioning circuit; accessing the lookup table; and extracting an inverse transfer function from the lookup table associated with the current state of the signal conditioning circuit, wherein convolving the digital input RF signal with the inverse transfer function further includes convolving the digital input RF signal with the inverse transfer function from the lookup table corresponding to the analog input RF signal or digital RF signal.

In some embodiments, the techniques described herein relate to a method, further including: filtering the analog input RF signal within an RF spectrum, wherein filtering the analog input RF signal includes: before digitizing the analog input RF signal, sensing the RF spectrum; and before convolving the digital input RF signal, altering the inverse transfer function based on a status of the RF spectrum.

In some embodiments, the techniques described herein relate to a method wherein filtering the analog input RF signal within an RF spectrum filters an interference event.

In some embodiments, the techniques described herein relate to a method, wherein the signal conditioning circuit includes at least one adaptive filter.

In some embodiments, the techniques described herein relate to a method, wherein the signal conditioning circuit includes an anti-aliasing filter.

In some embodiments, the techniques described herein relate to a system including: a radio frequency (RF) receiver configured to receive an analog input RF signal including: a signal conditioning circuit including one or more RF filters; at least one memory; and at least one processor configured and at least one memory, the at least one processor configured to perform steps of: receiving an inverse transfer function of a first state of a predicted plurality of states of the signal conditioning circuit; storing the inverse transfer function in a memory; receiving an analog input RF signal; digitizing the analog input RF signal, wherein digitizing the analog input RF signal generates a digital input RF signal; and convolving the digital input RF signal with the inverse transfer function to generate a digital output RF signal.

In some embodiments, the techniques described herein relate to a system, wherein the at least one memory includes a lookup table to store a plurality of inverse transfer functions for the predicted plurality of states, wherein the at least one processor is further configured to perform the steps of: determining the state of the signal conditioning circuit; accessing the lookup table; and extracting an inverse transfer function from the lookup table associated with the state of the signal conditioning circuit, wherein convolving the digital input RF signal with the inverse transfer function further includes convolving the digital input RF signal with the inverse transfer function from the lookup table corresponding to the analog input RF signal or digital RF signal.

In some embodiments, the techniques described herein relate to a system, wherein the at least one processor is further configured to perform the steps of: filtering the analog input RF signal within an RF spectrum, wherein filtering the analog input RF signal includes: before digitizing the analog input RF signal, sensing the RF spectrum; and before convolving the digital input RF signal, altering the inverse transfer function based on a status of the RF spectrum.

In some embodiments, the techniques described herein relate to a method for reducing distortion of a radio frequency (RF) transmission in a distorted environment including: generating a lookup table including inverse transfer functions in a memory of a RF transmitter, wherein the RF transmitter includes a signal conditioning circuit, including: measuring a transfer function of at least one state of a predicted plurality of states of the signal conditioning circuit; reporting the transfer function; calculating an inverse transfer function for the at least one state of the predicted plurality of the states of the signal conditioning circuit; and storing the inverse transfer function in the lookup table; obtaining digital transmission RF data corresponding to the RF transmission; determining a current state of the signal conditioning circuit; accessing the lookup table; extracting an inverse transfer function corresponding to the current state; convolving the digital transmission data with the inverse transfer function associated with the current state to generate a digital output RF signal; converting the digital output RF signal to an analog output RF signal; and transmitting the analog output RF signal.

In some embodiments, the techniques described herein relate to a method, further including: adapting an RF filter based on a first state or the inverse transfer function associated with the current state; and before converting the digital output RF signal to an analog output RF signal, reconstructing the digital RF signal via the RF filter, wherein reconstructing a digital RF signal via the RF filter reduces Nyquist artifacts in the analog output RF signal.

In some embodiments, the techniques described herein relate to a method, wherein the radio frequency (RF) transmission includes an interference event, wherein the interference event is reduced in the digital output RF signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
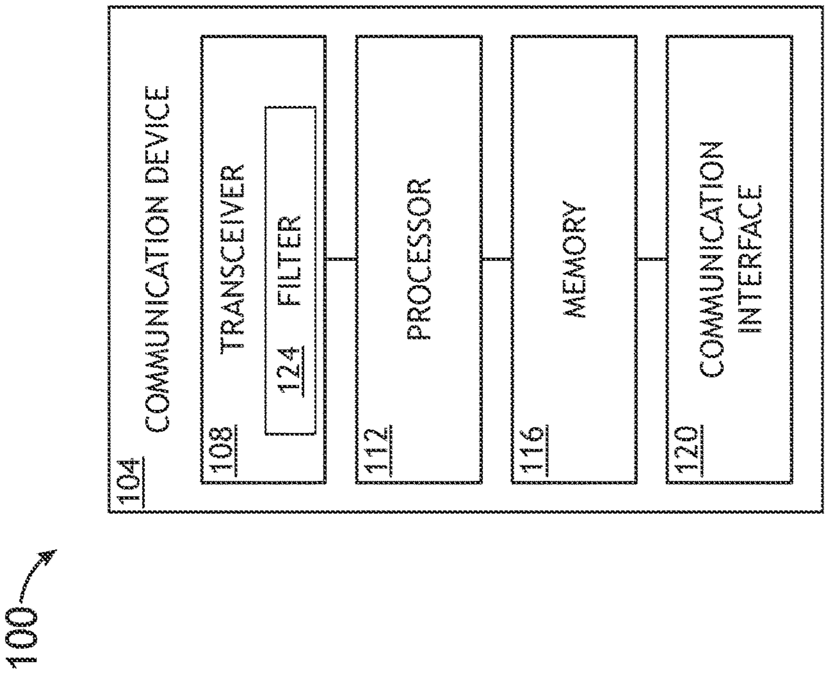
FIG. 1 illustrates a block diagram of a communication system that includes a communication device, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present), and B is false (or not present), A is false (or not present), and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system for reducing the distortive effects of RF filtering when sending and/or transmitting radio frequency (RF) signals in an interference environment, such as an environment where an adversary is jamming communication frequencies. The method includes mathematically applying an inverse transfer function to a digitized RF signal. The system may include a receiver and/or transmitter that collects and stores sets of transfer functions and/or inverse transfer functions for a plurality of states of the receiver/transmitter (e.g., such as receiver configurations), and then applies an inverse transfer function associated with the receiver/transmitter state to the digitized RF signal.

In some embodiments, the system and method include an adaptive filter that can sense a status of a target electromagnetic spectrum and then alter the linear transfer function to reduce the effects of interference.

Referring now to FIGS. 1-12, embodiments of a system 100 according to the inventive concepts disclosed herein are depicted. In embodiments, the system 100 includes a communication device 104 (e.g., a radio) that operates via radio frequencies (RF). The communication device 104 may comprise or operate as a receiver, a transmitter, or a transceiver. For example, the communication device 104 may comprise a transceiver 108 that is configured for 2-way communication in the RF domain. For issues of clarity, the term "transceiver" will be used herein when describing embodiments of the communication device 104. However, it should be noted that a communication device 104 that only has receiving capability may only include a receiver, and that a communication device that only has transmitting capability may only include a transmitter.

In embodiments, the communication device 104 further includes one or more processors 112, one or more memory 116, and one or more communication interfaces 120, as well as other components, equipment, and/or devices commonly included in a communication device 104, some or all of which may be communicatively coupled at any time, as shown in FIG. 1.

The at least one processor 112 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout.

The one or more processors 112 may be configured to process data, such as voice or digital data and/or signals received by the (e.g., transceiver 108). The one or more processors 112 may also be configured to process and/or output data and/or signals that are to be transmitted by the (e.g., transceiver 108). For example, the one or more processors 112 may be configured to receive signal data, such as receiving signal data from an analog RF input signal. In another example, the one or more processors 112 may be configured to modify received signal data, such as inverse transfer functions of transceiver states (e.g., filters or signal conditioning circuits of transceiver states), or transfer functions of transceiver states, that will be for convolving with a digitized analog RF input signal. The one or more processors 112 may be further configured to store the signal modifying data in memory 116. In embodiments, the one or more processors may be configured to convolve the signal modifying data (e.g., the inverse transfer functions) from a digital input RF signal resulting in a digital output RF signal.

In embodiments, the one or more processors 112 are configured to digitize an analog input RF signal into a digital input RF signal (e.g., via an analog-to-digital converter (ADC) circuit). In embodiments, the one or more processors 112 are configured to convert a digital output RF signal, or other transmission data into a corrected analog input RF signal (e.g., via a digital-analog converter (DAC) circuit).

The communication interface 120 may be operatively configured to communicate with components of the communication device 104 and the system 100. For example, the communication interface 120 can be configured to retrieve data from the one or more processors 112 or other components, transmit data for storage in the memory 116, retrieve data from storage in the memory 620, and so forth. The communication interface 120 can also be communicatively coupled with the one or more processors 112 to facilitate data transfer between components of the system 100 and devices communicatively coupled to the system 100. It should be noted that while the communication interface 120 is described as a component of the system 100, one or more components of the communication interface 120 can be implemented as external components communicatively coupled to the system 100 via a wired and/or wireless connection. The system 100 can also include and/or connect to one or more input/output (I/O) devices.

In embodiments, the communication device 104 includes one or more filters 124 configured to condition incoming and/or outgoing RF signals. For example, the one or more filters 124 may comprise one or more analog RF filters. In another example, at least one of the one or more filters 124 may comprise one or more digital RF filters. In another example, at least one of the one or more filters 124 may comprise one or more static filters. In another example, at least one of the one or more filters 124 may comprise one or more static filters. In another example, at least one of the one or more filters 124 may comprise one or more static filters. The one or more filters may include bandpass filters, low pass filters, high pass filters, notch/bandstop filters, diplexer filters, multiplexer filters, and the like. In embodiments, the transceiver is integrated into the transceiver 108 or receiver.

Figure 2:
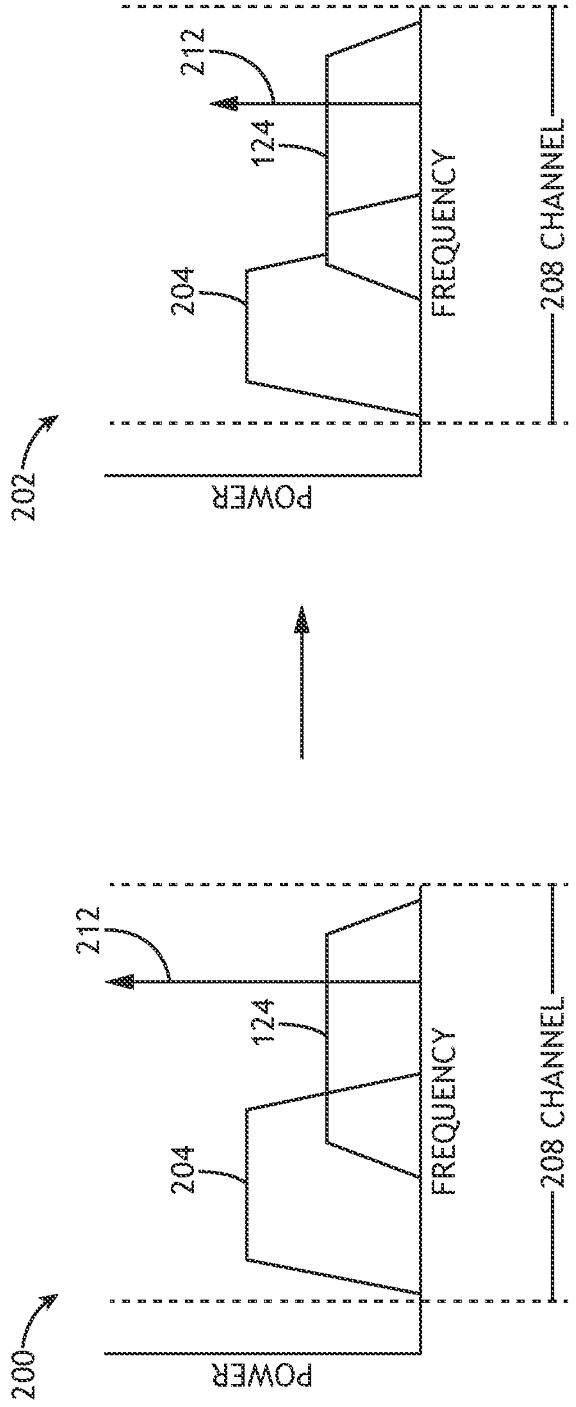
FIG. 2 illustrates a set of graphs that describe the action of a filter on a signal of interest during an interference event.

Communication issues in interfering environments (e.g., filtering issues in interfering environments), that are addressed by the embodiments of this disclosure are shown via the power/frequency graphs 200, 202 illustrated in FIG. 2. When a signal of interest 204 within a channel 208 is affected by an interfering event 212, a transceiver 108 can utilize a filter 124 to reduce the interfering event 212, as shown in graph 202. However, the reduction of interference by the filter 124 often results in an unwanted reduction of a portion of the signal of interest by the filter 124, causing distortion.

Figure 3:
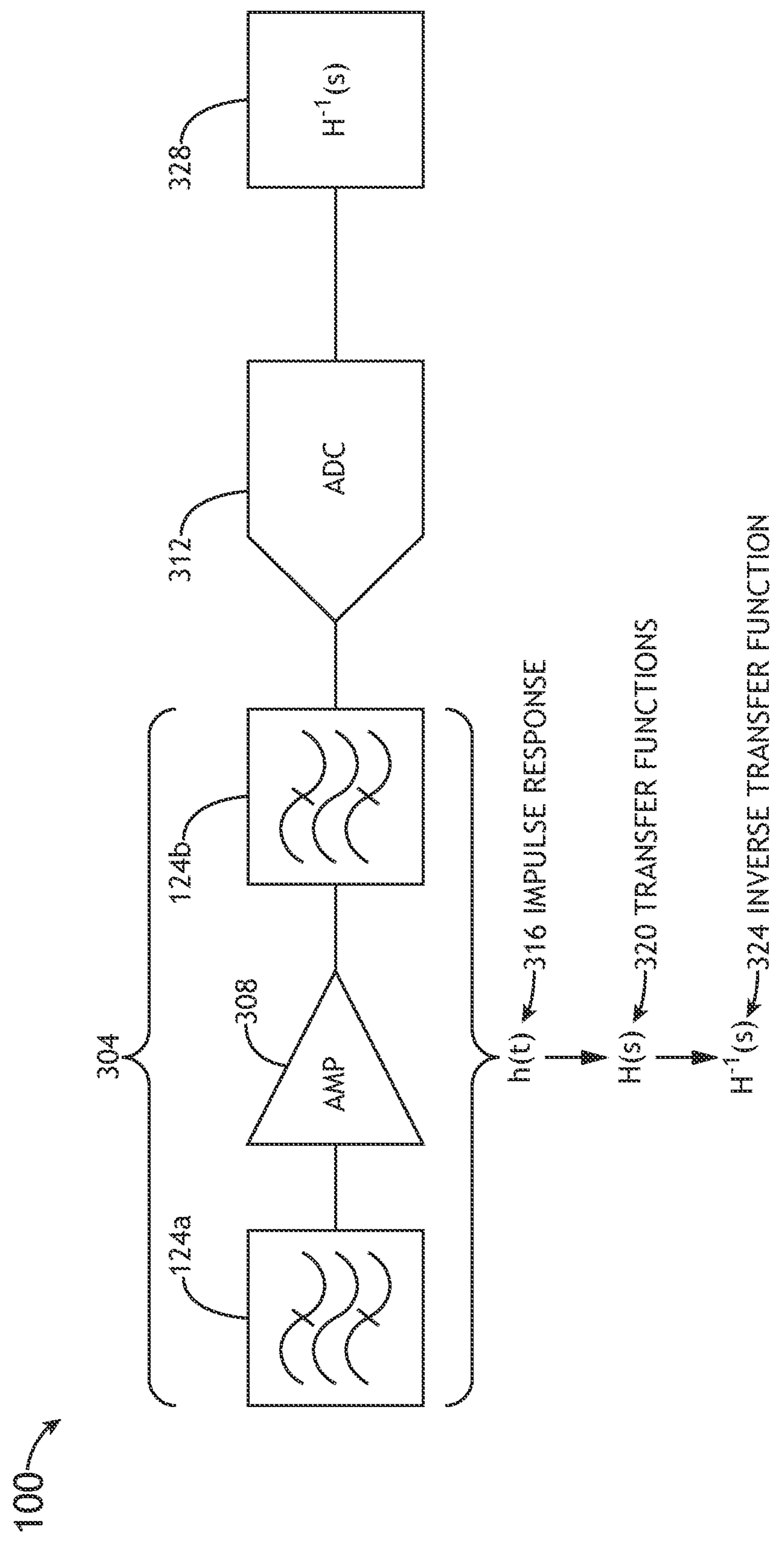
FIG. 3 illustrates a partial block diagram of a communication system.

In embodiments, and as shown in FIG. 3, a solution to preventing the distortion of the filter 124 to propagate through the system 100 is to determine a transfer function of the transceiver 108 (e.g., such as a linear receiver). For example, the system 100 may include a signal conditioning circuit 304 (e.g., that includes an amplifier 308 and two filters 124*a*-*b*) that conditions the analog signal (e.g., including but not limited to filtering an interference event 212, such as a jamming event) before the analog signal is converted to a digital signal via an ADC circuit 312. The signal conditioning circuit 304 keeps the transceiver system linear (e.g., prevents generation of non-linear elements in this receive signal). An impulse response 316 (e.g., h(t)) of the signal conditioning circuit 304 can be measured and/or calculated (e.g., via an analyzer, such as a network analyzer). The impulse response 316 is defined herein as a reaction of any dynamic system, such as the signal conditioning circuit 304 in response to some external change. Once an impulse response 316 is measured and/or calculated, a transfer function 320 (e.g., H(s)) can be calculated, which is defined herein as a mathematical representation of the relationship between the input and output of a system, such as the signal conditioning circuit 304. Once the transfer function 320 is calculated, an inverse transfer function 324 (e.g., $H^{-1}(s)$) can be calculated, and can be used to convolve (e.g., combine with) the digitized signal (e.g., via a convolution step 328) to produce a corrected signal. The calculation of the transfer function 320 and the inverse transfer function 324 may be performed either by the one or more processors 112 or the analyzer. The convolution step 328 is performed by the one or more processors 112. In some embodiments, the system 100 includes the analyzer.

Figure 4:
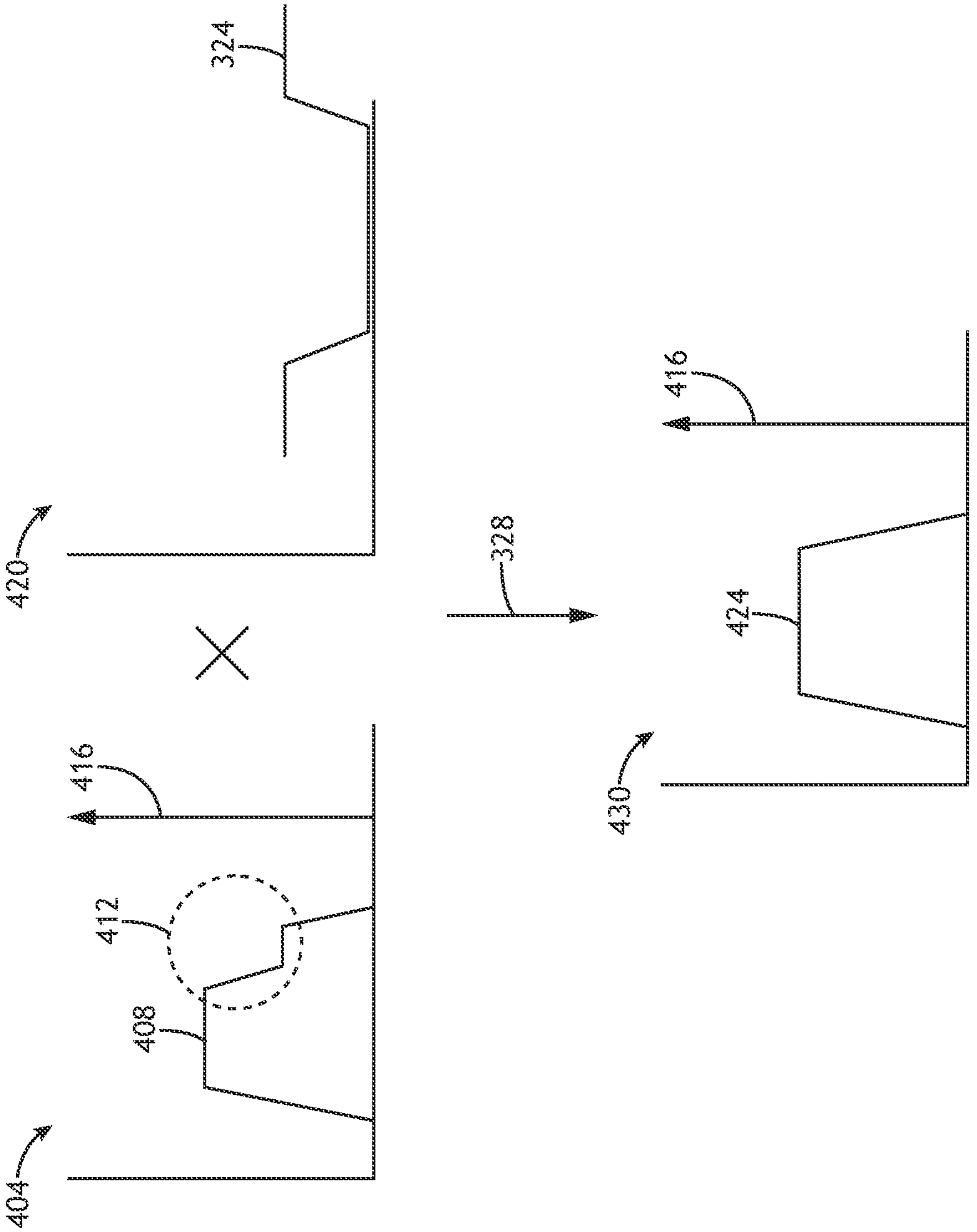
FIG. 4 illustrates a set of graphs that describe convolution of a distorted analog signal with an inverse transfer function.

An example of the convolution step 328 is shown in FIG. 4. In a first graph 404, a filtered signal of interest 408 is shown having a distortion 412 of the waveform, an unwanted result of the action of one or more filters 124 to reduce an interference event 416. In a second graph 420, a representation of the inverse transfer function 324 of the transceiver 108 is shown. The filtered signal of interest 408 is combined with the inverse transfer function 324 in the convolution step 328 to form a corrected digital signal 424, as shown in graph 430 (e.g., the corrected digital signal 424 matches the input signal as initially received). The processor can compute the full value of the corrected digital signal 424 in the digital domain.

Figure 5:
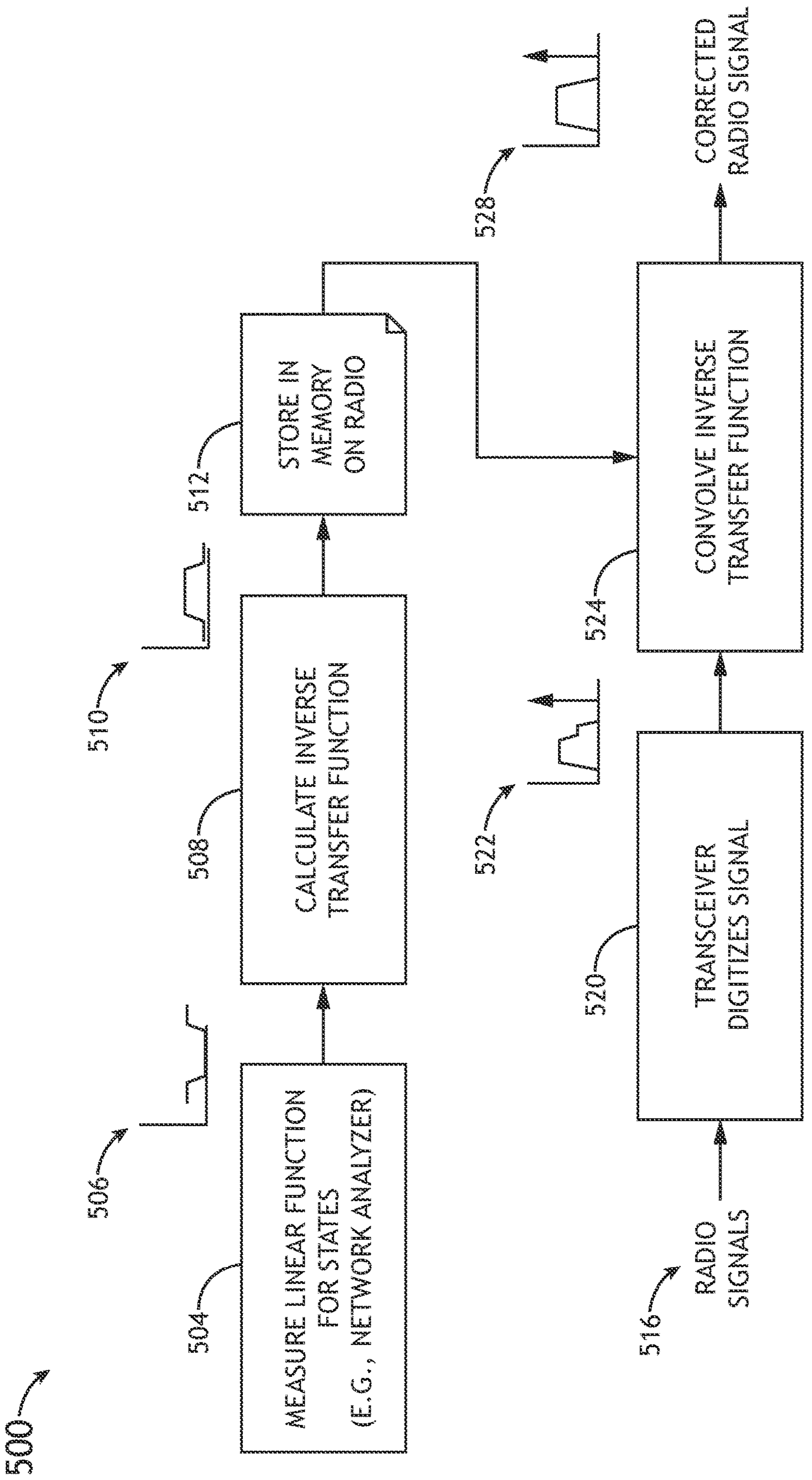
FIG. 5 illustrates a flowchart for a method of generating a corrected radio signal.

The prevention of distortion by the one or more filters 123 is illustrated further in a method 500 as illustrated in FIG. 5. In a first step 505, the transfer function 320, also referred to as a "linear function" or "linear transfer function, of the signal conditioning circuit 304 is measured. A representation of the transfer function 320 is shown in inset 506. In a further step, the inverse transfer function 324 is calculated (e.g., represented in insert 510) and stored in memory 116 in the transceiver 108 (e.g., a radio) in a step 512.

The method 500 further includes a step 516 of the transceiver 108 receiving an analog input RF signal (e.g., radio signals), which is digitized by the transceiver 108 in a step 520, producing the distorted signal as shown in the inset 522. The method 400 further includes convolving the inverse transfer function 324 with the digitized signal in a step 524 to produce a corrected radio signal, as represented in inset 528. It is important to note the step of convolving the inverse transfer function 324 includes convolving the inverse transfer function 324 with a digital, not analog, signal. In this manner, applying the inverse transfer function 324 (e.g., the inverse of the linear receiver transfer function) will remove the effect of the linear receiver, such as the linear receiver illustrated in FIG. 3.

Figure 6:
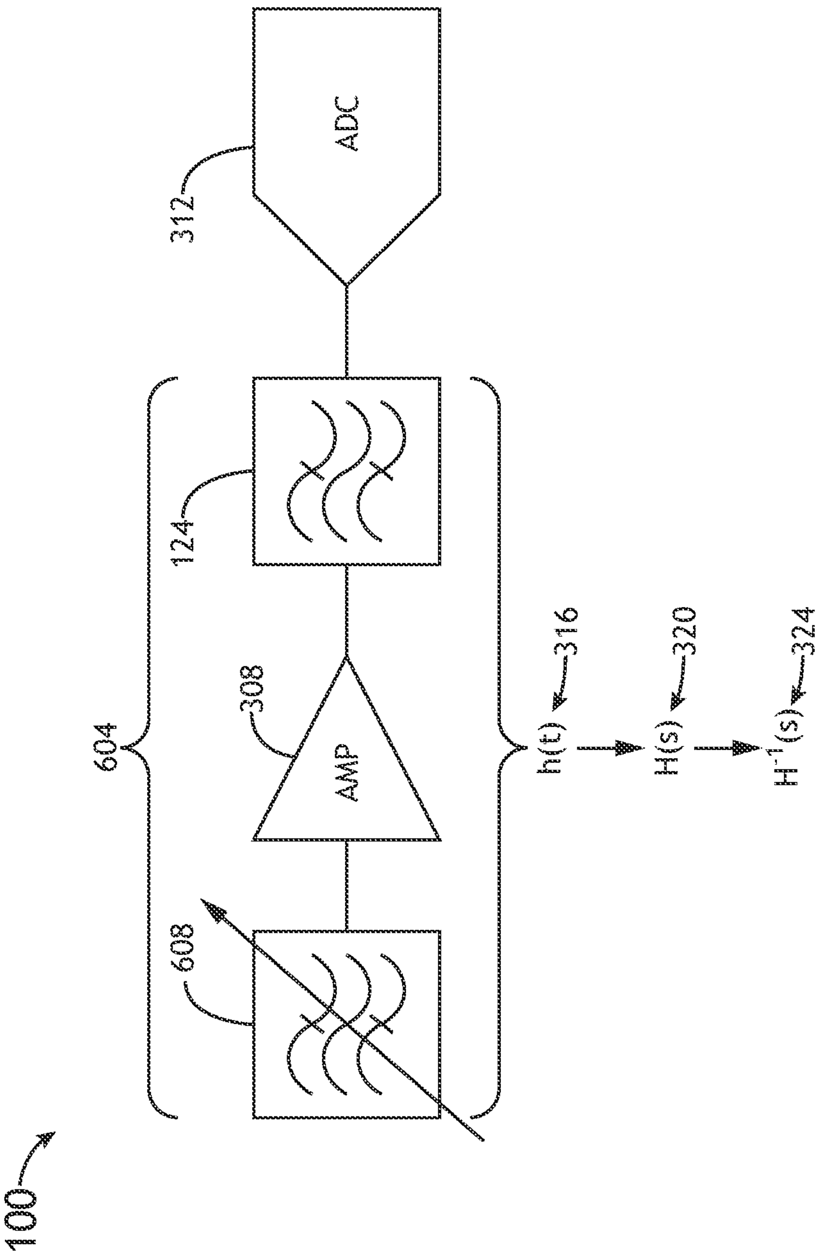
FIG. 6 illustrates a partial block diagram of a communication system.

In some embodiments, the system 100 includes a signal conditioning circuit 604 that includes an adaptive filter 608, as shown in FIG. 6. The adaptive filter 608 is configured to change/adapt signal filtering function based on spectrum input (e.g., local signals in the air at the receiver across the RF frequency spectrum). For example, the adaptive filter may sense a portion of the electromagnetic spectrum, resulting in a change of the transfer function 320 (e.g., linear transfer function) of the signal conditioning circuit 604. When the radio receiver recognizes signals are too strong and will cause distortion to the receiver electronics, the transfer function of 608 will be adjusted to reduce the amplitude of signal content in the frequency band where it would cause distortion. The filter 608 may automatically adapt using built-in sensors, or the state may be changed by the digital processor based on information in the received signals. While operating within the system 100 the adaptive filter 608 operates linearly and reports its state in real-time to the digital receiver. The system 100 is configured to measure transfer functions 320 all anticipated or predicted states of the signal conditioning circuit and to calculate and/or store a corresponding or associated inverse transfer function 324. One state may be a bandpass function, where signals at lower and higher frequencies are attenuated while the center passband passes through the filter with minimum distortions. Another state may be a notch function, where all signals pass through and only a certain frequency is attenuated. Another state may be a combination where most signals pass, but one or two notches attenuate certain frequencies.

Figure 7:
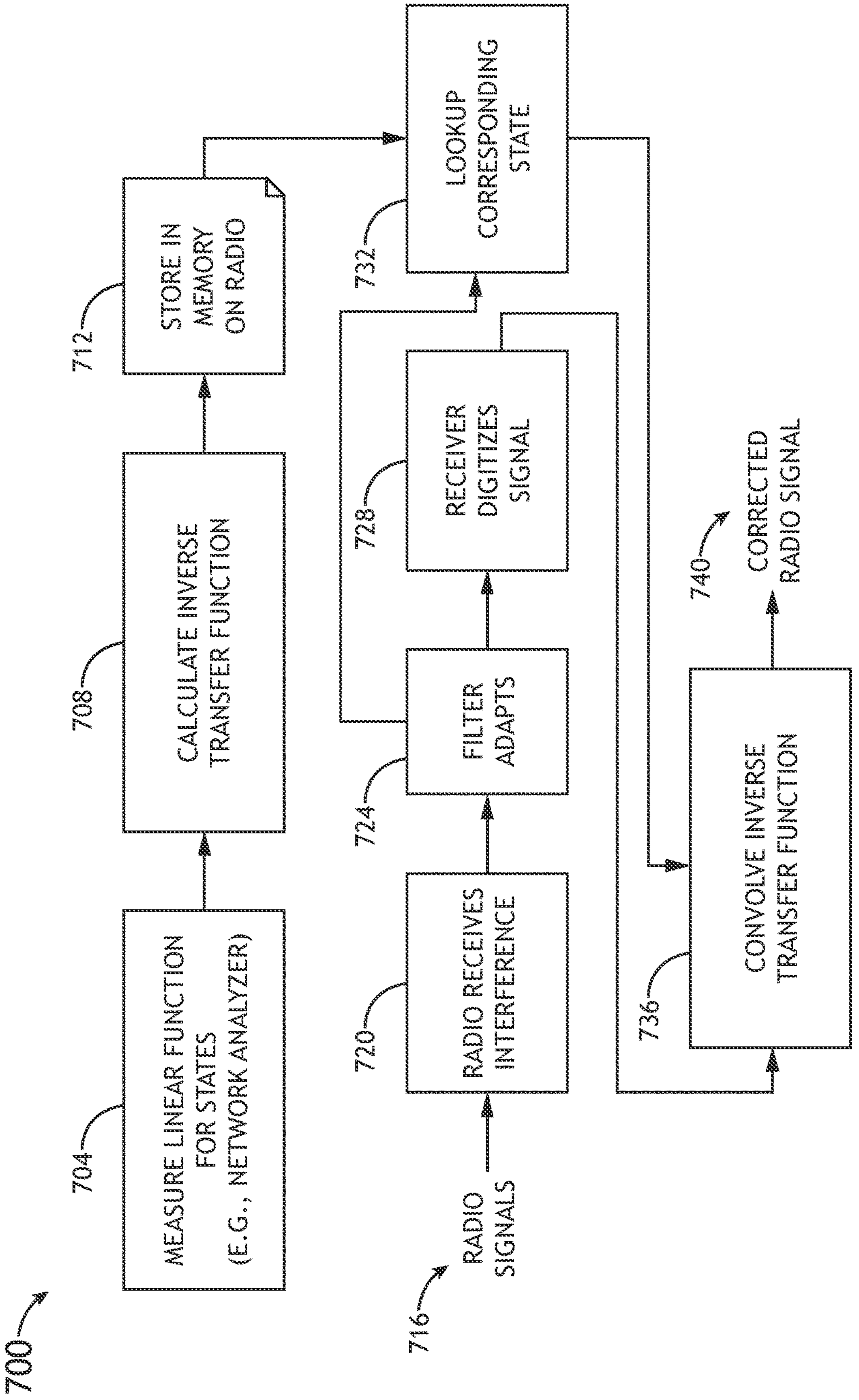
FIG. 7 illustrates a flowchart for a method of generating a corrected radio signal.

The use of the adaptive filter 608 (e.g., as part of an adaptive receiver/transceiver 108) within the system 100 is illustrated in a method 700 as shown in FIG. 7. In embodiments, the method 700 includes a step 704 of measuring transfer functions 320 for a plurality of states of the adaptive filter 608 and/or the signal conditioning circuit 604. The method 700 further includes a step 708 of calculating inverse transfer functions 324 of the transfer functions 320, which are stored in memory 116 (e.g., in a step 712). The inverse transfer functions 324 may be stored in a table (e.g., such as a lookup table) in the memory 116, allowing the lookup table to be accessed, and the stored inverse transfer function 324 to be extracted at a later time.

Within the method 700, the system 100 receives radio signals 716, such as input analog RF signals, that are affected by interference (e.g., step 720), such as an interference event 212. The adaptive filter 608 adapts to the interference event 212 in a step 724, while filtering the input analog RF signal and the receiver/transceiver 108 digitizes the signal in a step 728.

In embodiments, the method 700 includes a step 732 of looking up an inverse transfer function corresponding to or associated with the state of the filter 124, 608, and/or the signal conditioning circuit 304, 604. For example, the one or more processors 112 receives, or otherwise determines a state (e.g., a current state) of the filter 124, 608, and/or the signal conditioning circuit 304, 604. The one or more processors 112 then lookup and extract the corresponding/associated inverse transfer function 324 from the lookup table, then convolves the inverse transfer function 324 with the digitized RF signal in a step 736, resulting in a corrected output digital signal (e.g., corrected radio signal 740).

Figure 8:
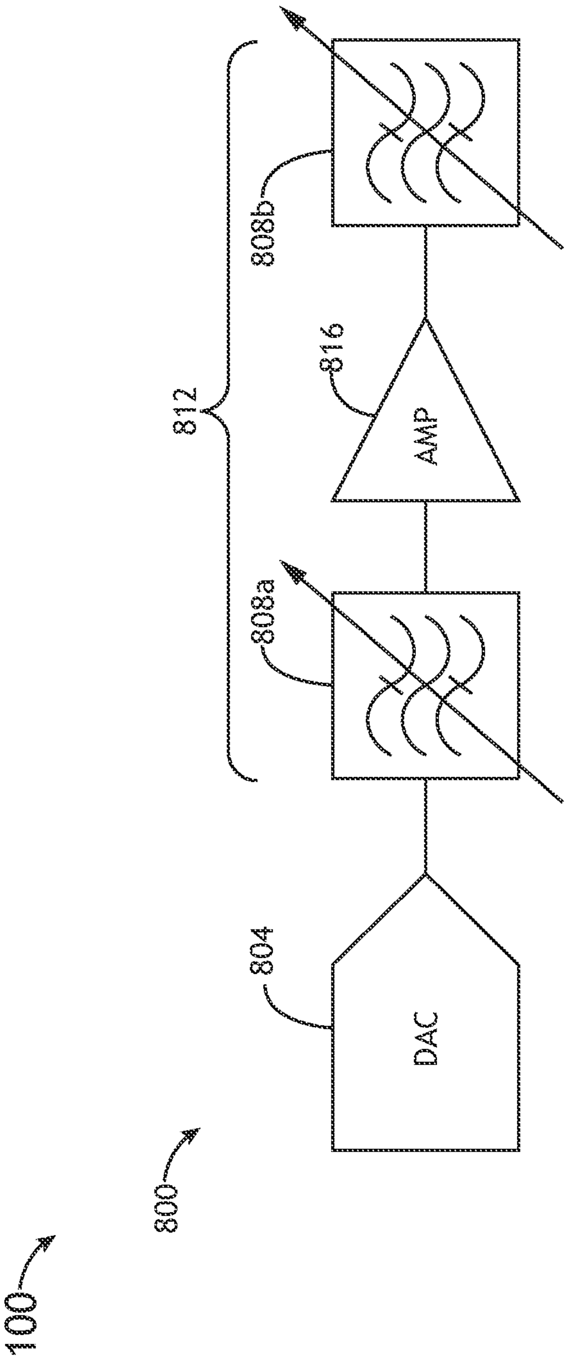
FIG. 8 illustrates a partial block diagram of a communication system.

In some embodiments, the system 100 includes a transmitter (e.g., transceiver 108) that utilizes a convolving step with an inverse transfer function 324 to produce a predistorted digital signal that is "corrected", when transmitted as an analog signal. For example, and as shown in FIG. 8, the system 100 may include a transmission circuit 800 that includes a digital-analog converter (DAC) 804 that converts signal data (e.g., digital transmission RF data) into an analog signal. The transmission circuit 800 may further include one or more adaptive filters 808*a*, 808*b* within a signal conditioning circuit 812 that filter the analog signal, the one or more adaptive filters 808*a-b* acting as a reconstruction filter that removes Nyquist products (e.g., artifacts or ghost artifacts) that occur during signal processing. In the presence of a power amplifier 816, the one or more adaptive filters 808*a-b* may reduce or eliminate harmonics within the analog signal.

Figure 9:
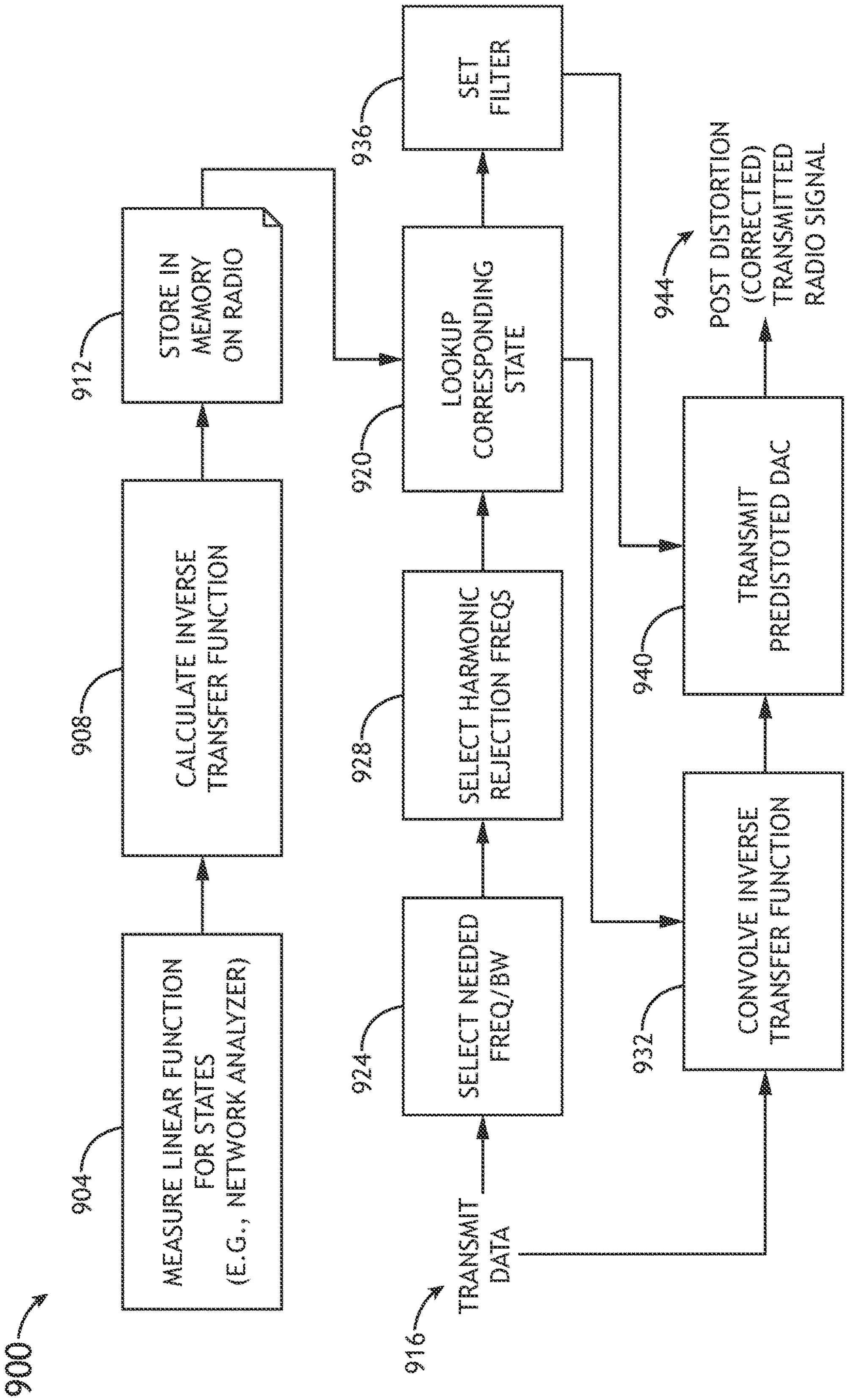
FIG. 9 illustrates a flowchart for a method of transmitting a corrected radio signal.

The use of the one or more adaptive filter 808*a-b* within the system 100 for removing Nyquist products and/or harmonics is illustrated in a method 900 as shown in FIG. 9. In embodiments, the method 900 includes a step 904 for measuring transfer functions 320 for one or more states of the plurality of states for one or more filters 808*a-b* and/or signal conditioning circuits 812. The method further includes calculating inverse transfer functions 324 of one or more of the plurality of states (e.g., in a step 908), and storing the inverse transfer functions 324 in a memory 116 (e.g., in a step 912). For example, the inverse transfer functions 324 may be stored in a lookup table within the memory 116.

In embodiments of the method 900, transmission data 916 is obtained, and a step 920 of looking up and extracting the inverse transfer function 324 corresponding to or associated with the state of one or more filters 808*a-b* or the signal conditioning circuit 812 is performed. Prior to the lookup step 920, the system may perform a step 924 of selecting the frequencies and or bandwidth required by the system 100 to transmit the signal. The system 100 may also perform a step 928 of selecting harmonic frequencies that are to be rejected or removed from the signal.

In embodiments, the method 900 may include a step 932 of convolving the extracted inverse transfer function 324 with the digital transmission RF data (e.g., transmission data 916) to generate a convolved digital output RF signal. The adaptive filters 808*a-b* are set accordingly in step 936, and the convolved digital output RF signal is converted to a pre-distorted analog output RF signal (e.g., via the DAC 804) in a step 940. The analog output RF signal is then filtered via the one or more adaptive filters 804*a-b* and/or signal conditioning circuit 812 to produce a post-distorted, or corrected, radio signal 944 that is transmitted.

Figure 10A:
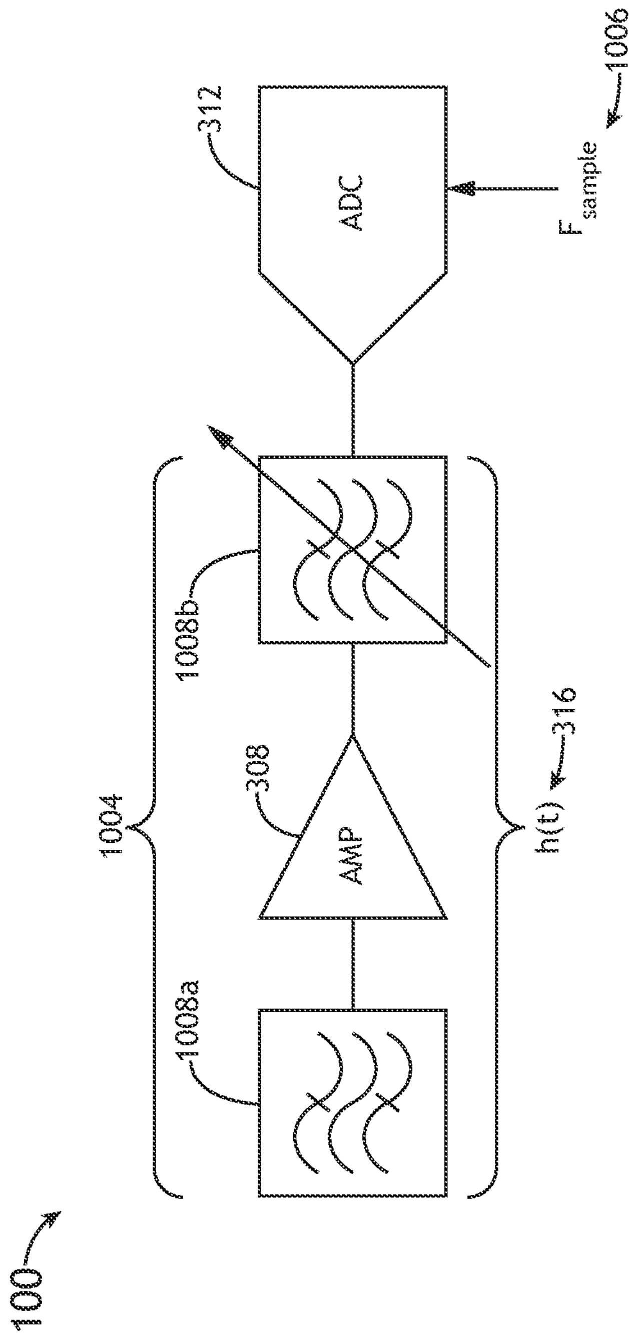
FIG. 10A illustrates a partial block diagram of a communication system receiver.
Figure 10B:
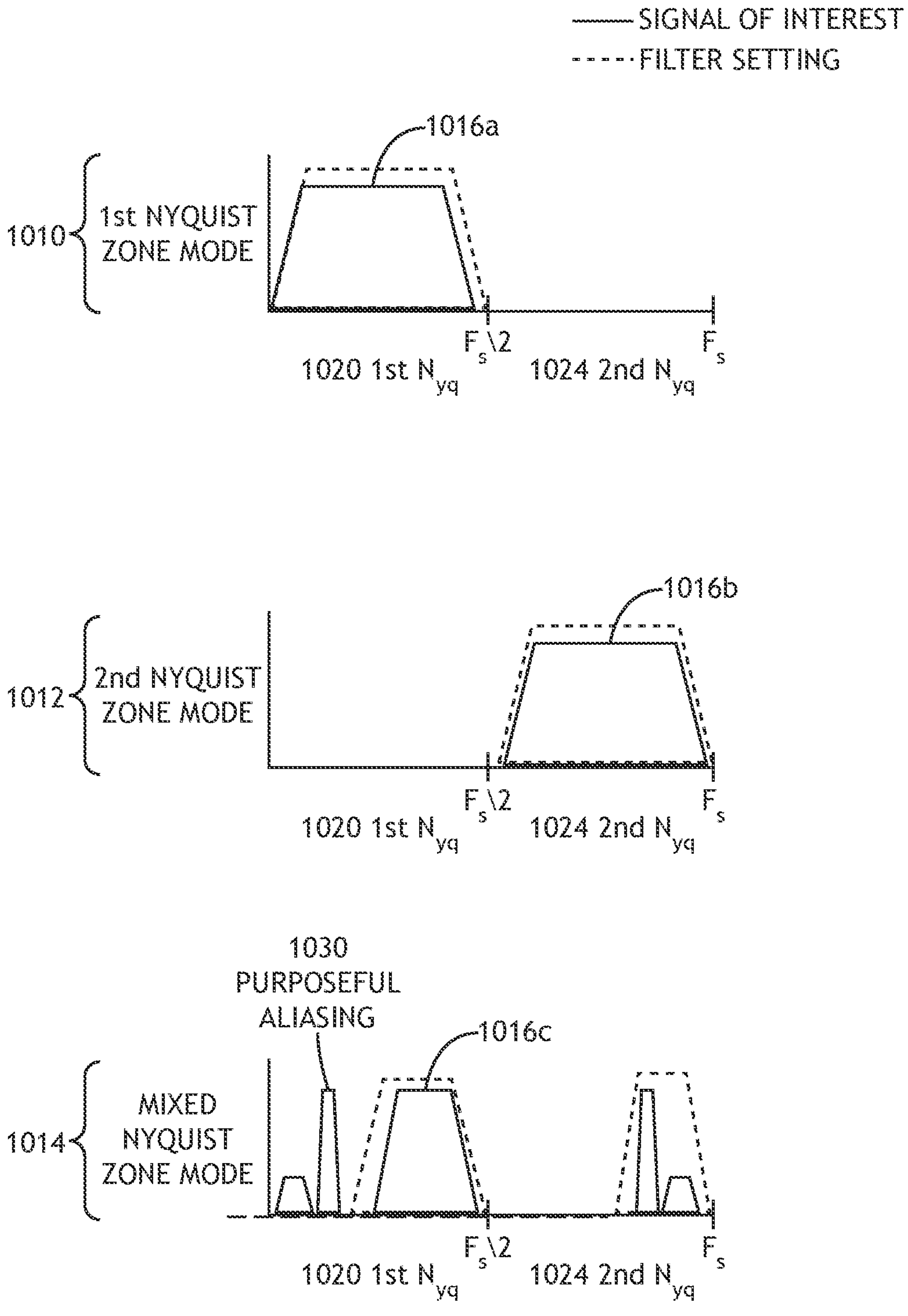
FIG. 10B illustrates a set of graphs describing an anti-aliasing or purposeful aliasing effect of the communication system shown in FIG. 10A.

In embodiments, the system 100 includes a signal conditioning circuit 1004 that includes one or more anti-aliasing filters 1008*a-b* or filter sets, as shown in FIG. 10A. For example, a receiver/transceiver 108 of the system 100 may include a signal conditioning circuit 1004 that acts as an anti-alias filter that allows a Nyquist zone of interest to be selected, and then sampled 1006 by the ADC circuit 312, as shown in graphs 1010, 1012 of FIG. 10B. For example, the signal conditioning circuit 1004 may be programmed to filter a signal of interest 1016*a* within a first Nyquist Zone 1020 (e.g., from 0 to $F_s/2$), as shown in graph 1010. In another example, the signal conditioning circuit 1004 may be programmed to filter a signal of interest 1016*b* within a second Nyquist Zone 1024 (e.g., from $F_s/2$ to $F_s$) as shown in graph 1012. The ability of a programmable signal conditioning circuit to select a Nyquist Zone of interest enables the receiver to permit the filtering of mixed frequency bands using purposeful aliasing 1030, as shown in graph 1014. In FIG. 10B, a user desires to receive signals at 1016*c* and 1016*d* (right). By setting the transfer function to pass a portion of the first Nyquist Zone 1020 and a portion of the second Nyquist Zone 1024, but reject other frequencies, a receiver can collect signals of interest without overlap distortion.

Figure 11:
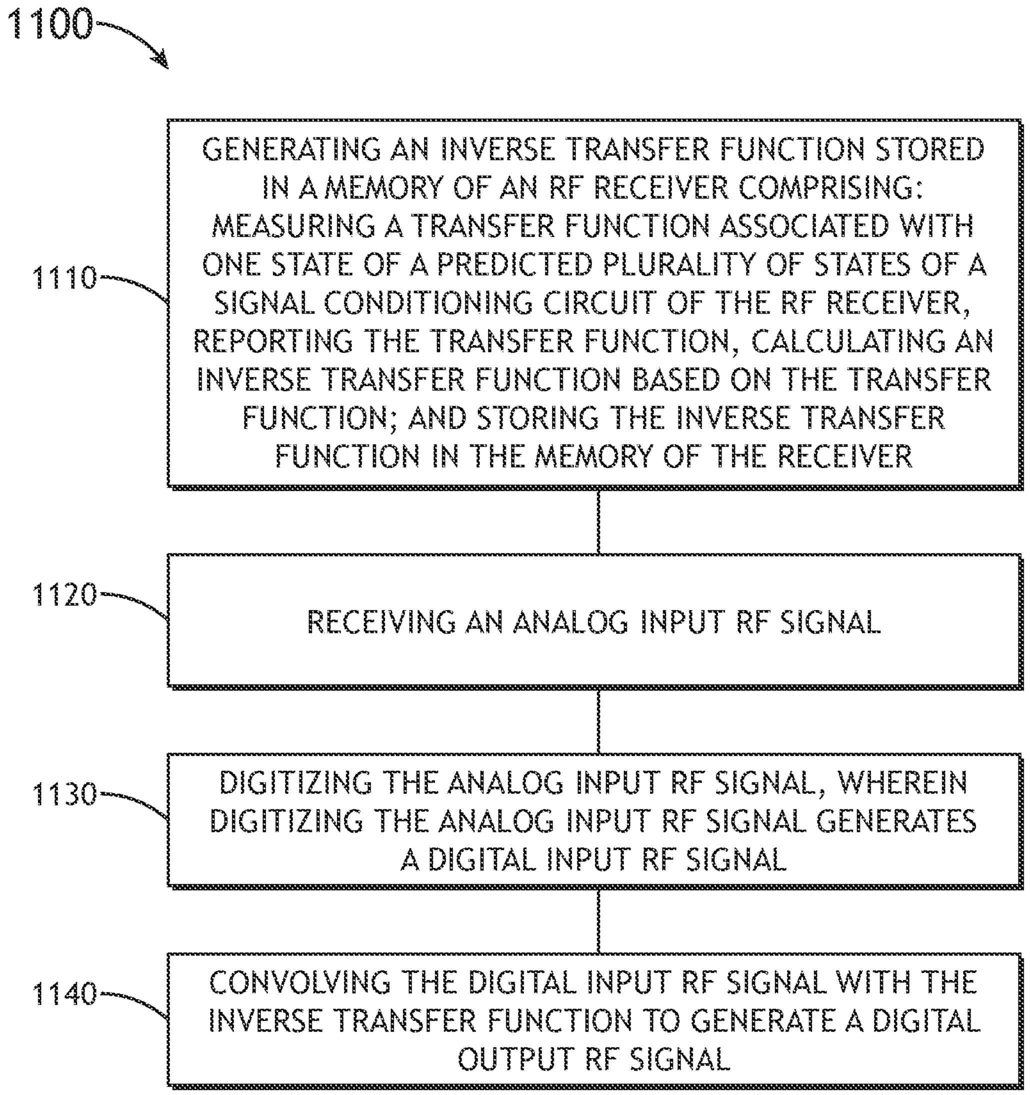
FIG. 11 illustrates a flowchart for a method of generating a corrected radio signal.

FIG. 11 is a flowchart of a method 1100 for generating a corrected output radio frequency (RF) signal, such as a corrected output RF signal in an interference environment as described herein. In embodiments, the method 1100 includes a step 1110 of generating an inverse transfer function stored in a memory of an RF receiver comprising: measuring a transfer function associated with one state of a predicted plurality of states of a signal conditioning circuit of the RF receiver, reporting the transfer function, calculating an inverse transfer function based on the transfer function; and storing the inverse transfer function in the memory of the receiver. The measuring of the transfer function may be performed via a network analyzer or other type of analyzing device.

In embodiments, the method 1100 includes a step 1120 of receiving an analog input RF signal. The analog RF signal may be received via any RF receiving device, such as a transceiver 108, receiver, or radio. The RF signal may be any type of electromatic communication signal, such as an electromagnetic signal within the range of 20 kHz to 300 GHz.

In embodiments, the method 1100 includes a step 1130 of digitizing the analog input RF signal, wherein digitizing the analog input RF signal generates a digital input RF signal. In embodiments, the method includes a step 1140 of convolving the digital input RF signal with the inverse transfer function to generate a digital output RF signal.

Figure 12:
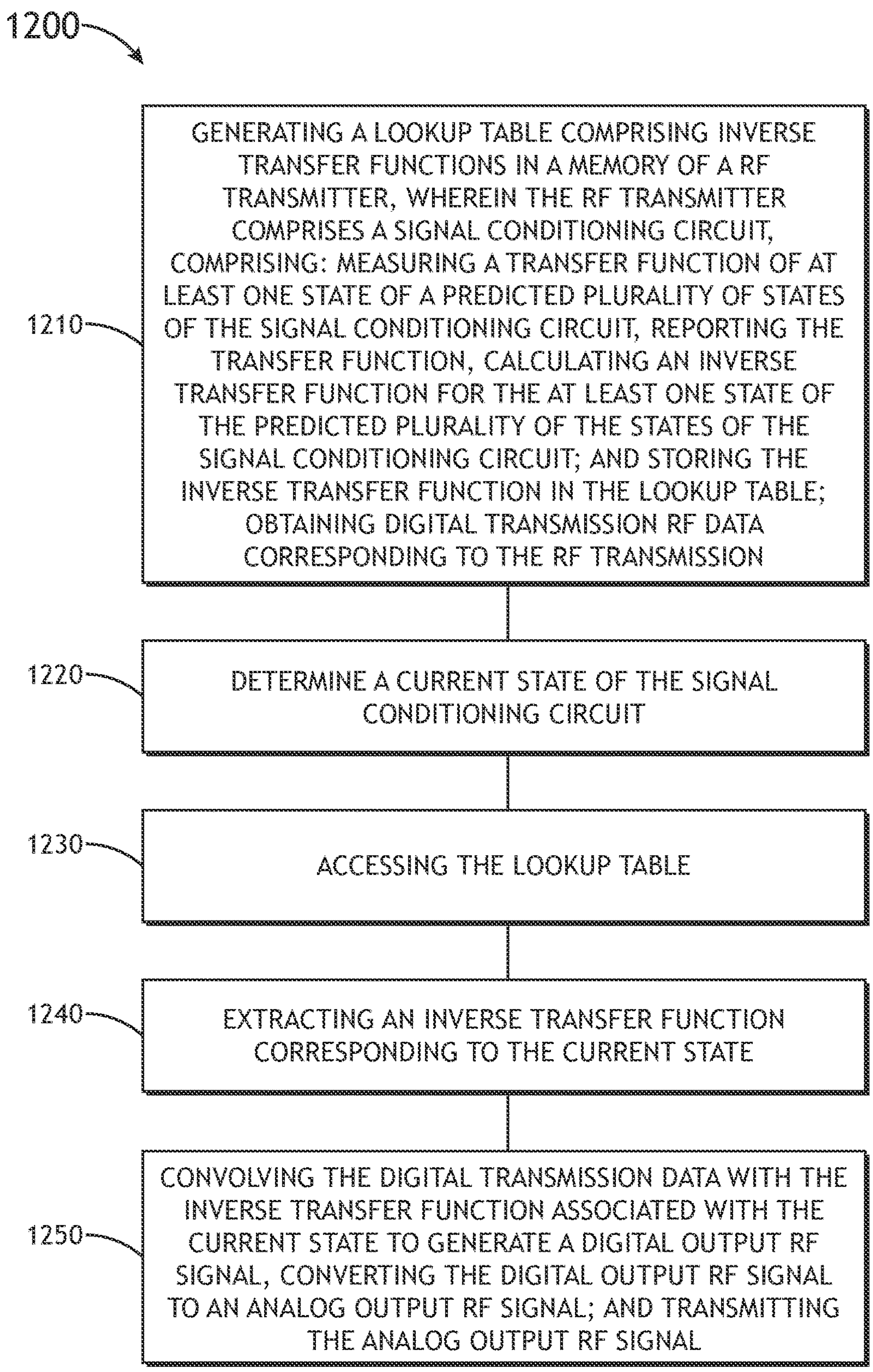
FIG. 12 illustrates a flowchart for a method of generating a corrected radio signal.

FIG. 12 is a flowchart of a method 1200 for reducing distortion of an RF transmission in a distorted, or interference, environment. In embodiments, the method 1200 includes a step 1210 of generating a lookup table comprising inverse transfer functions in a memory of a RF transmitter, wherein the RF transmitter comprises a signal conditioning circuit 304, 604, 812. Generating the lookup table comprises measuring a transfer function of at least one state of a predicted plurality of states of the signal conditioning circuit 304, 604, 812, reporting the transfer function, calculating an inverse transfer function for the at least one state of the predicted plurality of the states of the signal conditioning circuit 304, 604, 812, storing the inverse transfer function in the lookup table, and obtaining digital transmission RF data corresponding to the RF transmission.

In embodiments, the method 1200 include a step 1220 of determining a current state of the signal conditioning circuit. In embodiments, the method 1200 includes a step 1230 of accessing the lookup table. In embodiments, the method 1200 includes a step 1240 of extracting an inverse transfer function corresponding to the current state. In embodiments, the method 1200 includes a step 1250 of convolving the digital transmission data with the inverse transfer function associated with the current state to generate a digital output RF signal, converting the digital output RF signal to an analog output RF signal, and transmitting the analog output RF signal. In this manner, the received RF signal is digitized, and then convolved with the corresponding inverse transfer function to produce a corrected RF signal.

As used throughout and as would be appreciated by those skilled in the art, "at least one non-transitory computer-readable medium", or memory 116 may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order and are not necessarily meant to be limited to the specific order or hierarchy presented.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed, and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method for generating a corrected output radio frequency (RF) signal comprising:

generating an inverse transfer function stored in a memory of an RF receiver, wherein generating the inverse transfer function comprises:

measuring a transfer function associated with one state of a predicted plurality of states of a signal conditioning circuit of the RF receiver;

reporting the transfer function;

calculating an inverse transfer function based on the transfer function; and storing the inverse transfer function in the memory of the receiver, wherein storing the inverse transfer function in the memory of the receiver further comprises storing the inverse transfer function in a lookup table;

determining a current state of the signal conditioning circuit;

accessing the lookup table; and extracting an inverse transfer function from the lookup table associated with the current state of the signal conditioning circuit, receiving an analog input RF signal;

filtering the analog input RF signal within an RF spectrum, wherein filtering the analog input RF signal comprises:

sensing the RF spectrum; and altering the inverse transfer function based on a status of the RF spectrum;

digitizing the analog input RF signal, wherein digitizing the analog input RF signal generates a digital input RF signal; and convolving the digital input RF signal with the inverse transfer function to generate a pre-distorted digital output RF signal, wherein convolving the digital input RF signal with the inverse transfer function further comprises convolving the digital input RF signal with the inverse transfer function from the lookup table corresponding to the analog input RF signal or digital RF signal.

2. The method of claim 1, wherein filtering the analog input RF signal within an RF spectrum filters an interference event.

3. The method of claim 1, wherein the signal conditioning circuit includes at least one adaptive filter.

4. The method of claim 3, wherein the signal conditioning circuit comprises an anti-aliasing filter.

5. A system comprising:

a radio frequency (RF) receiver configured to receive an analog input RF signal comprising:

a signal conditioning circuit including one or more RF filters;

at least one memory, wherein the at least one memory comprises a lookup table to store a plurality of inverse transfer functions for a predicted plurality of states; and at least one processor configured and at least one memory, the at least one processor configured to perform steps of:

receiving an inverse transfer function of a first state of a predicted plurality of states of the signal conditioning circuit;

storing the inverse transfer function in a memory;

determining the state of the signal conditioning circuit;

accessing the lookup table; and extracting an inverse transfer function from the lookup table associated with the state of the signal conditioning circuit, receiving an analog input RF signal;

filtering the analog input RF signal within an RF spectrum, wherein filtering the analog input RF signal comprises:

sensing the RF spectrum; and altering the inverse transfer function based on a status of the RF spectrum;

digitizing the analog input RF signal, wherein digitizing the analog input RF signal generates a digital input RF signal; and convolving the digital input RF signal with the inverse transfer function to generate a pre-distorted digital output RF signal, wherein convolving the digital input RF signal with the inverse transfer function further comprises convolving the digital input RF signal with the inverse transfer function from the lookup table corresponding to the analog input RF signal or digital RF signal.

6. A method for reducing distortion of a radio frequency (RF) transmission in a distorted environment comprising:

generating a lookup table comprising inverse transfer functions in a memory of a RF transmitter, wherein the RF transmitter comprises a signal conditioning circuit, wherein generating the lookup table comprising comprises:

measuring a transfer function of at least one state of a predicted plurality of states of the signal conditioning circuit;

reporting the transfer function;

calculating an inverse transfer function for the at least one state of the predicted plurality of the states of the signal conditioning circuit; and storing the inverse transfer function in the lookup table;

adapting an RF filter based on a first state or the inverse transfer function associated with the first state;

obtaining digital transmission RF data corresponding to the RF transmission;

determining a current state of the signal conditioning circuit;

accessing the lookup table;

extracting an inverse transfer function corresponding to the current state;

convolving the digital transmission data with the inverse transfer function associated with the current state to generate a pre-distorted digital output RF signal;

reconstructing the digital RF signal via the RF filter, wherein reconstructing a digital RF signal via the RF filter reduces Nyquist artifacts;

converting the digital output RF signal to an analog output RF signal; and transmitting the analog output RF signal.

7. The method of claim 6, wherein the radio frequency (RF) transmission includes an interference event, wherein the interference event is reduced in the digital output RF signal.

* * * * *